United States Patent

Haag

Patent Number: 5,167,581
Date of Patent: Dec. 1, 1992

[54] DIRECTABLE SPOUT FOR A CONVEYOR

[76] Inventor: Steve Haag, R.R. #1, Box 102, Cullom, Ill. 60929

[21] Appl. No.: 725,652

[22] Filed: Jul. 3, 1991

[51] Int. Cl.⁵ .................................................. A01D 90/10
[52] U.S. Cl. ...................................... 460/114; 56/16.6
[58] Field of Search ............... 460/114, 115; 414/519, 414/532, 523, 526; 198/550.1, 668, 671; 56/14.7, 16.6, 16.4

[56] References Cited

U.S. PATENT DOCUMENTS

| 215,818 | 5/1879 | Hough. |
| 252,376 | 6/1882 | Hinckley. |
| 326,964 | 9/1885 | Fisk. |
| 420,131 | 1/1890 | Walrath. |
| 608,585 | 8/1898 | Dentler. |
| 1,719,788 | 7/1929 | Snyder. |
| 1,798,231 | 3/1931 | Thiemann. |
| 2,558,006 | 6/1951 | Shriver et al. . |
| 2,664,189 | 12/1953 | Hager. |
| 2,667,028 | 1/1954 | Weishaar. |
| 2,724,516 | 11/1955 | Weishaar. |
| 2,818,163 | 12/1957 | Hiblom et al. . |
| 3,039,925 | 4/1962 | Martin et al. . |
| 3,126,109 | 3/1964 | Loschen. |
| 3,575,306 | 4/1971 | Obermeyer et al. . |
| 3,844,433 | 10/1974 | Laajala. |
| 3,860,010 | 1/1975 | Anderson et al. .............. 460/114 X |
| 4,332,261 | 6/1982 | Webster ............................... 460/114 |
| 4,540,086 | 9/1985 | David et al. . |
| 4,699,218 | 10/1987 | Schwitters ........................ 56/16.6 X |
| 4,875,569 | 10/1989 | Oury et al. . |
| 4,923,358 | 5/1990 | Van Mill. |

Primary Examiner—Thuy M. Bui

[57] ABSTRACT

A power operated deflectable spout is provided for conveyors which move material through a hollow tube. The spout has a substantially vertical wall which depends downwardly at an end of the tube and projects into a flow path of the material being discharged from the tube. Power apparatus for adjusting the angular orientation of the vehicle wall is provided as well as a control for controlling the power apparatus. Such a spout is useful on grain combines to direct a flow of grain from the combine to a collecting vehicle. The use of a directable spout obviates the requirement for precise alignment of the combine and the collecting vehicle.

21 Claims, 2 Drawing Sheets

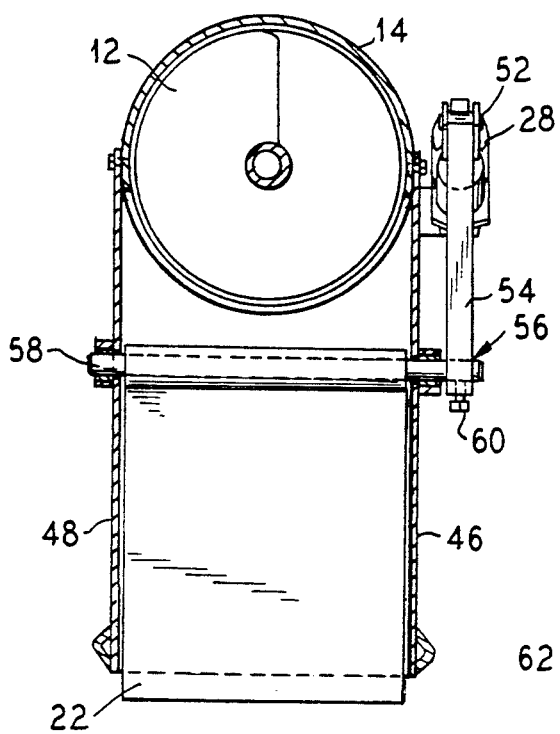
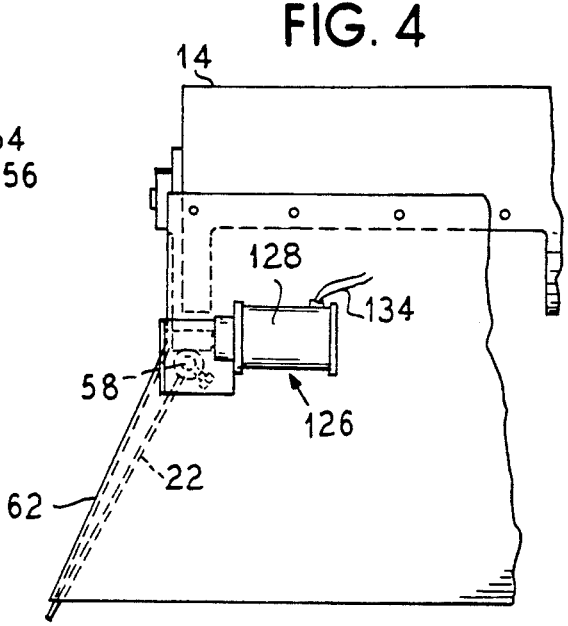
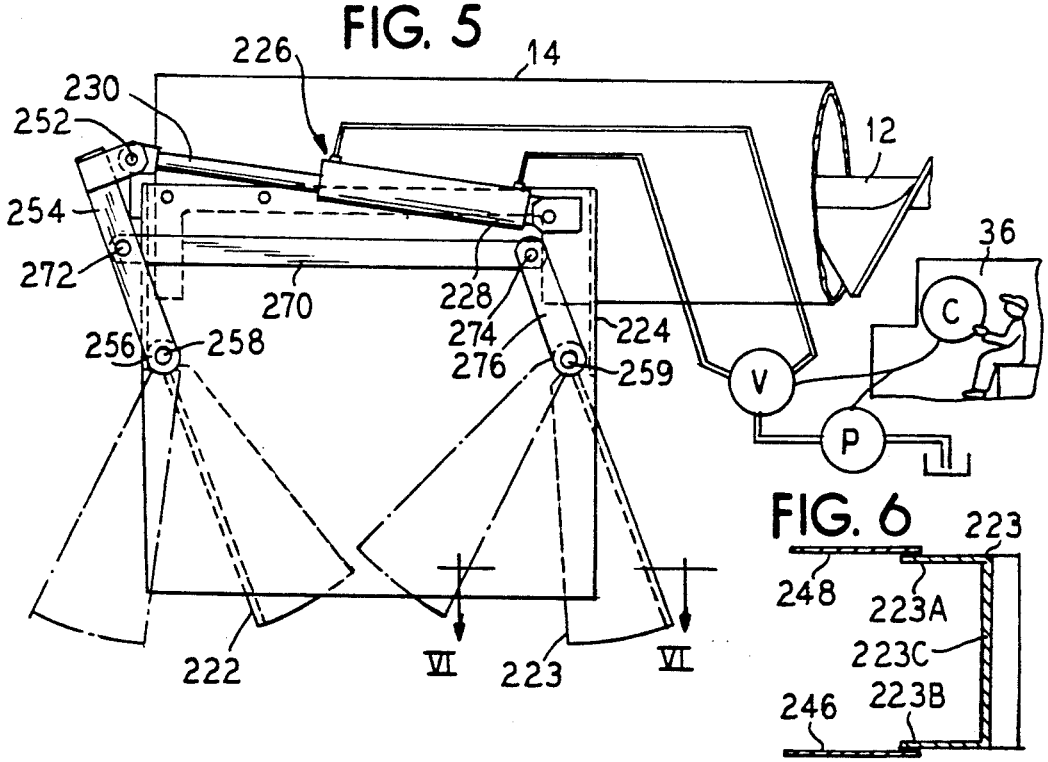

DIRECTABLE SPOUT FOR A CONVEYOR

BACKGROUND OF THE INVENTION

The present invention relates to conveyors which are used to transport material and discharge it under the influence of gravity, and more particularly to a directable spout for intercepting the flow of material from the conveyor discharge and directing it toward a desired location.

Material conveyors are well known and are used in a wide variety of applications, including for conveying grain from a combine to a truck or trailer or other transport vehicle for transporting the grain from the field where it is being harvested to a storage location.

In such an application, as the grain is discharged from the auger conveyor on the combine, it generally falls vertically under the influence of gravity from an end of the conveyor into the transport vehicle. It is therefore critical to be sure that the transport vehicle and combine are carefully aligned so that the receiving area in the transport vehicle will be accurately positioned below the end of the conveyor. Otherwise, material flowing from the conveyor might miss the transport vehicle and end up on the ground, thereby being wasted.

It is of course possible to move either the transport vehicle or combine to provide the precise alignment, however this can be somewhat difficult, particularly if visibility is somewhat restricted in the transport vehicle.

The conveying of the material from the combine to the transport vehicle is done by the combine operator who is provided with appropriate controls in a cab of the combine to initiate the conveying mechanism and to terminate its operation when the transport vehicle is filled or the combine container is empty.

It would be an advance in the art if there were provided a means by which the combine operator could selectively direct the output of the combine conveyor so that precise location between the combine and the transport vehicle is not required or at least not the degree of precision presently required.

SUMMARY OF THE INVENTION

The present invention provides a directable spout for a conveyor in which there is a substantially vertical deflector wall which depends downwardly at an end of the conveyor and intersects the flow path of material leaving the conveyor so as to direct the material to a desired location. Power means, which may be in a form of an electric motor or a hydraulic or pneumatic piston, are operably connected to the deflector wall and controls are provided for an operator to control the power means to adjust the position of the deflector wall as desired. Preferably, in the case of a conveyor for use on a grain combine, the control means, which may be in the form of switches or levers, would be located in the control cab where the operator is seated so that the operator can adjust the position of the deflector wall of the spout without having to leave the combine cab.

In an embodiment of the invention, there is a deflector housing which depends from the conveyor tube and the deflector wall is positioned between the stationary walls of the housing.

By providing a power operated deflector wall, complex mechanical linkages between the operator and the deflector wall are not required, avoiding any deterioration problems in such linkages which are exposed to the weather. Further, in some combines there is a significant distance between the operator cab and the end of the conveyor which would make linkages quite impractical to use.

BRIEF DESCRIPTION OF THE DRAWINGS

FIG. 3 is a sectional view taken generally along the lines III—III of FIG. 2.

FIG. 4 is a partial side sectional view of an alternate embodiment of the mechanism for redirecting the spout wall.

FIG. 5 is a side sectional view of an alternate embodiment of the mechanism for moving the deflector wall.

FIG. 6 is a section view taken generally along the lines VI—VI of FIG. 5.

DESCRIPTION OF THE PREFERRED EMBODIMENTS

Figure 1:
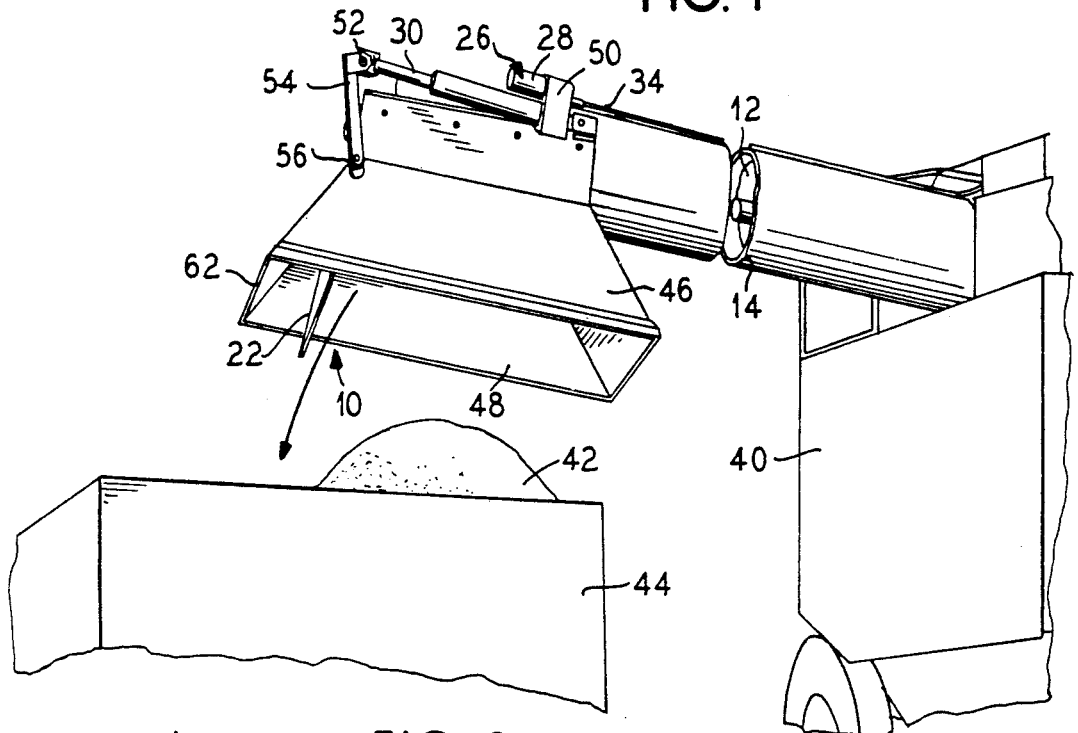
FIG. 1 is a partial perspective view of a directable spout combining the principles of the present invention.

In FIG. 1 there is illustrated a directable spout 10 for use with a conveyor 12 which moves material through a hollow tube 14. A distal end 16 of the tube 14 includes an opening 18 for discharging material in a flow path 20 influenced by gravity.

The directable spout 10 includes a substantially vertical wall 22 which depends downwardly adjacent to a distal edge 23 of the opening 18 and projects into the flow path 20. The deflector wall 22 may be positioned within a stationary housing 24 which depends from the tube 14. A power means 26 which, in the embodiment illustrated in FIGS. 1-3, comprises an electric motor 28 which alternately extends and retracts a rod 30, is provided for changing an angular orientation of the deflector wall 22 relative to the tube 14. The wall 22 is pivotable through an angle 32 of at least 60°. A control means C (FIG. 5) is provided for controlling the power means 26.

Figure 2:
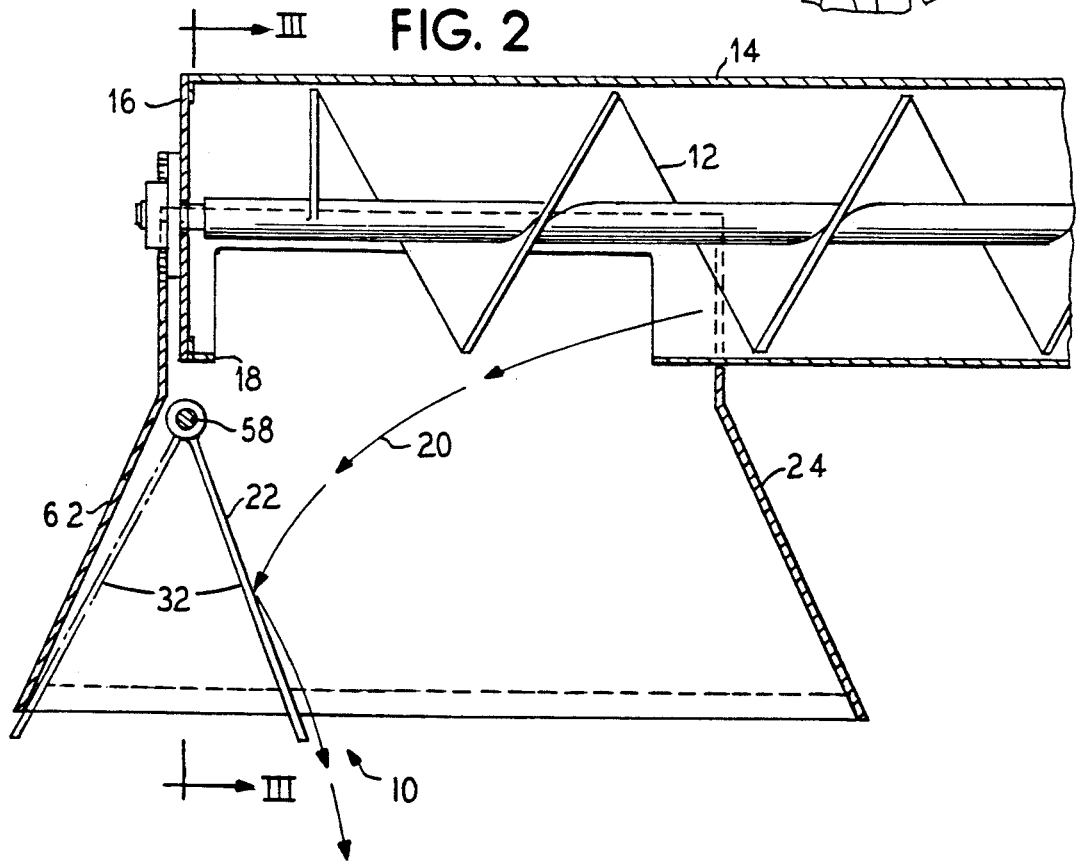
FIG. 2 is a side sectional view of a portion of the auger conveyor and directable spout with a deflector wall.

In the embodiment of FIGS. 1-3, the power means 26 is the electric motor 28 and electric conducting wires 34 extend along the length of the tube 14 and connect to the control means C. Preferably, the control means C is located within a cab 36 in which an operator is seated.

In a preferred embodiment of the invention, the deflector spout 10 is utilized in combination with a grain combine 40 and the conveyor 12 is an auger conveyor which conveys grain 42 from the combine to a storage vehicle 44.

The deflector housing 10 may have a pair of substantially vertical sidewalls 46, 48 with the deflector wall 22 extending between the vertical sidewalls 46, 48. The operator of the combine is able, by operating the controls C, to adjust the angular position of the deflector wall 22 to cause the flow path 20 of the grain to be modified so as to redirect the flow of grain from the conveyor 12. In this manner, the alignment between the combine 40 and the storage vehicle 44 is not required to be as precise as without such a directable spout.

In the embodiment of FIGS. 1-3 the electric motor 28 operates through a gearing mechanism 50 to cause the rod 30 to reciprocate forwards and backwards relative to the motor 28. The rod 30 is pivotally connected at 52 to an arm 54 which, in turn, is rigidly, but adjustably, connected at 56 to an axle 58 which is secured to the deflector wall 22. Thus, as the rod 30 moves forwards and backwards, the wall 22 is caused to pivot along with axle 58. The connection between the arm 54 and the axle 58 may be adjusted, such as by the use of a set screw 60 so that different end points of the angular deflection of wall 22 may be selected.

An end wall 62 of the housing 24 provides an outside stop against further outward rotation by the depending wall 22.

Another embodiment of the invention is illustrated in FIG. 4 in which a different power means 126 is provided. In this embodiment, the power means 126 comprises an electric motor 128 which has its output directly connected to the axle 58 of the deflectable wall 22. Again, electric wires 134 extend from the motor 128 to the controls C.

In FIG. 5, yet another embodiment of the power means 226 is is illustrated. In this embodiment the power means comprises a cylinder 228 for receiving a pressurized fluid from a pump P and which is directed through a valve V. Such an arrangement could be either a hydraulic or pneumatic system.

In such an arrangement, the pressurized fluid is used to extend or retract a rod 230 which is pivotally attached at 252 to an arm 254 which is rigidly attached at 256 to the axle 258 of the deflectable wall. In this embodiment two deflectable walls, 222 and 223 are illustrated, the first wall 222 adjacent to the distal edge 23 of the opening 18 and the second wall 223 adjacent to a proximal edge 25 of the opening. A section of the deflectable wall 223 (which is the same as deflectable wall 222) is shown in FIG. 6. In this embodiment it is seen that the deflectable wall 223 includes sidewall segments 223a, 223b and a connecting wall portion 223c. The sidewalls 223a and 223b telescope with sidewalls 246, 246 of the spout housing 224. Thus, the housing 224 is not provided with end walls, but rather the deflectable walls comprise movable end walls. The two deflectable walls 222, 223 are connected together by a link 270 which is pivotally connected at 272 to the arm 254 and is pivotally connected at 274 to a second arm 276 which, in turn, is rigidly connected to an axle 259 for the second deflector wall 223.

Again, an operator is provided with controls C in the cab area through which the operator can control the power means, including the pump P and valve V to operate the pressurized fluid cylinder 228 to effect angular movement of the deflector walls 222, 223.

Various types of power means known to those of ordinary skill in the art could be utilized to move the deflector walls as suggested and, it will be appreciated that one or two deflector walls may be utilized which either operate solely within the housing or act as a part of the housing as shown.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. For use with a grain combine having a cab area where an operator of said combine is to be seated and having an auger discharge conveyor in the form of a hollow tube with an opening in a sidewall of said tube at a distal end of said tube for discharging grain harvested by said combine, a directable spout comprising:
   a movable deflector wall depending downwardly adjacent to a distal edge of said opening;
   power means operably connected to said deflector wall for changing an angular orientation of said deflector wall; and
   control means located in said cab for controlling said power means.

2. A directable spout according to claim 1, further including a second deflector wall depending downwardly from said tube at a proximal edge of said opening, said deflector walls being linked so as to move together.

3. A directable spout according to claim 1, wherein said power means comprises electric means.

4. A directable spout according to claim 3, wherein said power means comprises an electric motor operably connected to said deflector wall.

5. A directable spout according to claim 1, wherein said deflector wall depends from and is rigidly secured to a pivot axle and said motor has a drive shaft connected to said pivot axle.

6. A directable spout according to claim 1, wherein said motor drives a gear mechanism and a rod member, connected to said gear mechanism, is caused to reciprocate upon forward and reverse rotation of said gear mechanism, said second rod member being operably connected to said deflector wall.

7. A directable spout according to claim 1, wherein said power means comprises pressurized fluid means.

8. A directable spout according to claim 7, wherein said power means comprises a hydraulic piston operably connected to said deflector wall, said hydraulic piston driven by a hydraulic pump associated with said combine.

9. A directable spout according to claim 7, wherein said power means comprises pneumatic means.

10. A directable spout according to claim 1, wherein said deflector wall is positioned within a stationary housing depending from said tube and said deflector forms an end wall of said housing.

11. A directable spout according to claim 10, wherein said deflector wall has sidewall portions telescoping with sidewalls of said stationary housing.

12. A directable spout according to claim 1, wherein said deflector wall is deflectable through an angle of at least 60 degrees.

13. A grain combine comprising:
   a cab providing an area for an operator of said combine to be seated;
   an auger discharge conveyor in the form of a hollow tube with an opening in a sidewall of said tube at a distal end of said tube for discharging grain harvested by said combine; and
   a directable spout comprising:
      a deflector housing depending downwardly from a distal end of said tube, said housing having a pair of vertical sidewalls;
      a pivotable deflector wall depending downwardly at said distal end of said tube at a distal edge of said opening and extending between said vertical sidewalls;
      power means operably connected to said deflector wall for changing an angular orientation of said deflector wall relative to said tube through a range of at least 60 degrees; and control means located in said cab for controlling said power means.

14. For use with a conveyor in the form of a hollow tube with an opening adjacent to a distal end of said tube for discharging material in a flow path, a directable spout comprising:

a substantially vertical wall depending downwardly at said distal end of said tube in said flow path;

power means operably connected to said deflector wall for changing an angular orientation of said wall relative to said tube; and control means for controlling said power means.

15. A directable spout according to claim 14, wherein said power means is powered by electric means.

16. A directable spout according to claim 14, wherein said power means comprises an electric motor operably connected to said wall.

17. A directable spout according to claim 14, wherein said power means is powered by hydraulic means.

18. A directable spout according to claim 14, wherein said power means is powered by pneumatic means.

19. A directable spout according to claim 14, wherein said deflector wall is positioned within a stationary housing depending from said tube and said deflector forms an end wall of said housing.

20. A directable spout according to claim 19, wherein said deflector wall has sidewall portions telescoping with sidewalls of said stationary housing.

21. A directable spout according to claim 14 wherein said deflector wall is deflectable through an angle of at least 60 degrees.

* * * * *